United States Patent [19]

Domres

[11] 4,382,583
[45] May 10, 1983

[54] GEAR AND RACK PORTABLE TORCH DRIVE

[76] Inventor: Franklin W. Domres, 4117 Crescent Beach Rd., Manistee, Mich. 49660

[21] Appl. No.: 235,530

[22] Filed: Feb. 18, 1981

[51] Int. Cl.³ .............................................. B23K 7/10
[52] U.S. Cl. .................................................... 266/77
[58] Field of Search ...................... 266/70, 71, 67, 77

[56] References Cited

U.S. PATENT DOCUMENTS

| | | | |
|---|---|---|---|
| 2,283,347 | 5/1942 | Young | 266/70 |
| 2,568,074 | 9/1951 | Launder | 266/67 |
| 3,485,306 | 12/1969 | Gulley | 266/67 |

Primary Examiner—W. Stallard
Attorney, Agent, or Firm—Price, Heneveld, Huizenga & Cooper

[57] ABSTRACT

A portable torch support and guide wherein a torch mounting carriage is advanceable along a guide track by a drive gear and its actuator on the carriage, the drive gear being in engagement with a gear rack along said guide track. Two or more modules of track can be interconnected in alignment such that the carriage is advanced along a desired distance.

5 Claims, 5 Drawing Figures

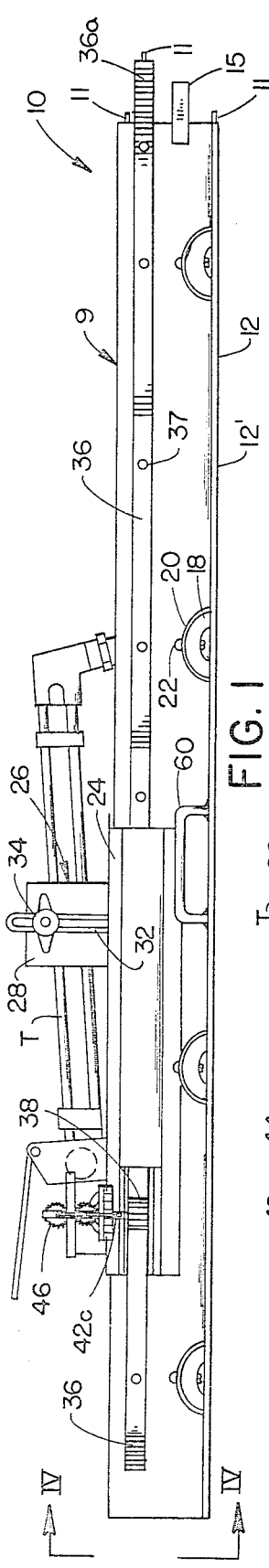
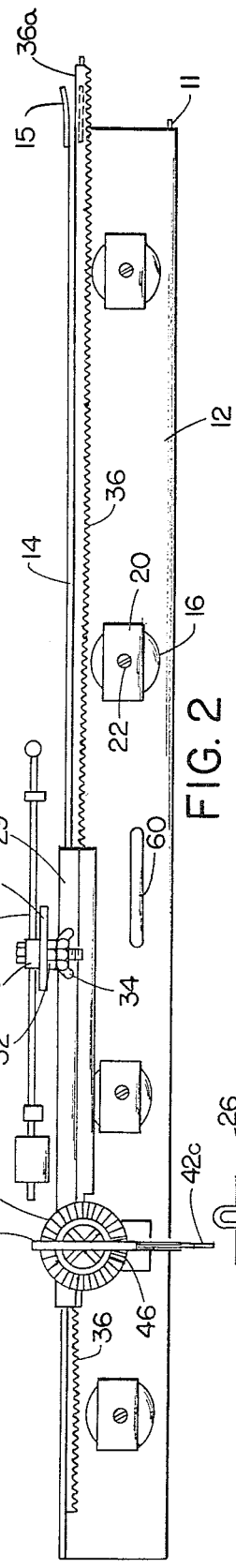
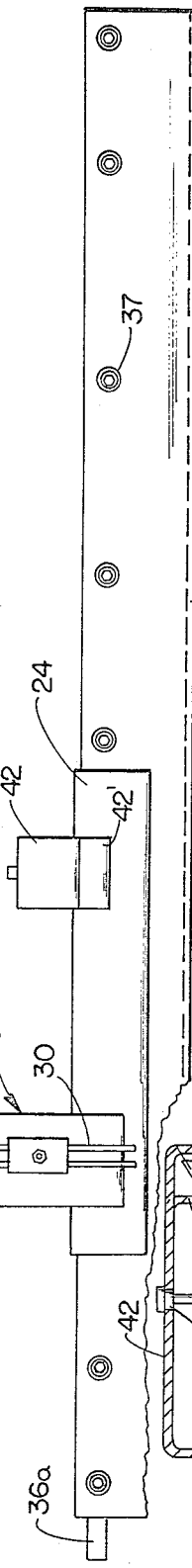

GEAR AND RACK PORTABLE TORCH DRIVE

BACKGROUND OF THE INVENTION

This invention relates to a portable torch support, guide and drive.

Mechanized advancement of a cut-off torch along a workpiece is generally known, there having been a variety of machines devised for this general purpose. Some of these employ a gear and rack arrangement for torch advancement, see e.g. U.S. Pat. Nos. 2,568,074; 2,283,347 and 3,485,306. Typically, such machines are permanent type units, although some special purpose units as in U.S. Pat. No. 3,908,973 can be clamped to the workpiece, or as in U.S. Pat. No. 3,485,306 and British Pat. No. 546,009 can be magnetically secured to the workpiece.

SUMMARY OF THE INVENTION

An important object of this invention is to provide a portable cut-off torch support and guide capable of quick and easy attachment to a workpiece in any desired location, e.g. even in a storage yard, so that there is no necessity of transporting large heavy stock to a special processing area and no requirement for electrical power. The unit is particularly advantageous for small welding shops and farm usage. With the novel unit, straight and accurate cuts can be achieved. The torch mount is on a carriage advanceable along a guide by a gear and rack interengagement with a releasable connection to the carriage. The rack is attached to and supported by an upright wall of the guide. Two or more modules of the support, each module having its own rack, are assembleable into aligned relationship, enabling the torch carriage to be advanced consecutively along the modules over a desired length of travel. The modules are magnetically retained on the workpiece.

BRIEF DESCRIPTION OF THE DRAWINGS

FIG. 1 is a front elevational view of a module of the novel apparatus showing the torch carriage;

FIG. 2 is a plan view of the apparatus in FIG. 1;

FIG. 3 is an elevational view from the opposite side of that in FIG. 1;

FIG. 4 is an enlarged end elevational view taken from the left end of FIG. 1; and FIG. 5 is a fragmentary elevational view of the right end of the module in FIG. 1 in axially aligned arrangement with the left end of a second module.

DESCRIPTION OF THE PREFERRED EMBODIMENT

Referring now specifically to the drawings, the novel apparatus 10 includes an elongated support base 12 having upstanding from one edge thereof an elongated carriage guide track 14. These two members are preferably the flanges of a piece of angle iron stock such that the horizontal flange forms the support base and the vertical flange forms the carriage track. At spaced intervals along the support base is a plurality of openings 16. Through each opening extend the two polar ends of an upstanding magnet 18 so as to be generally coplanar with bottom surface 12' of support base 12. Each of the series of magnets is retained in position by a semicylindrical upstanding retainer 20 as of sheet metal or the like having its ends secured to the support base astraddle of the opening, with the magnet attached to the retainer by a bolt or other fastener 22.

Positioned on and straddling track 14 is an inverted U-shaped slide carriage 24 having an upstanding torch mount subassembly 26 thereon. The torch mount subassembly may include a backplate 28, a torch receiving clip 30, and a slide clamp 32, or the equivalent, to enable a torch T to be held as in FIG. 2. The torch may be attached and removed by fastener 34 such as a bolt subassembly.

Extending longitudinally of the elongated structure, parallel to the support base and the guide is a gear rack 36 secured to the upstanding flange 14 as by fasteners 37 (FIG. 3) or formed as a part thereof, to be integral therewith.

This gear rack is longitudinally offset of the support, i.e. with one end foreshortened so as to not extend to the end of the support, and the other end extending beyond the end of track 14 as at 36a to enable overlap thereof with a second supplemental track module 36a in end to end alignment with the track depicted. More specifically, the support base 12 and track 14 form one module 9 which can be cooperatively arranged in axial alignment with one or more additional modules 9' (FIG. 5), as particularly described hereinafter.

Meshing with rack 36 is a spur gear 38. Gear 38 is mounted on axle 40 supported by a pair of bearings 41 and 43 in the top and bottom of gear box housing 42. Housing 42 is attached at 42' and 42" to carriage 24. Also attached to axle 40 in the housing is bevel gear 44 engaged by smaller drive bevel gear 46. Gear 46 is mounted on shaft 48 suspended on flange 42a and housing wall 42b, extends from the housing and has a manual crank 42c on the outer end portion. Rotation of crank 42c rotates drive gear 46, driven gear 44, shaft 40, and spur gear 38 engaging rack 36 to drive carriage 24 along guide track 14.

To enable the portable unit to be readily carried about, a suitable handle, e.g. inverted U-shaped handle 60, is attached to the assembly, preferably to base 12, positioned so as not to interfere with any of the operative components.

At one end, e.g. the right end as depicted in FIG. 1, of the module is a plurality of alignment projections such as pins 11, preferably with one pin on each flange, one at the juncture of the flanges, and one on the extended end of the rack. Like-positioned cooperative recesses 13 (FIG. 4) are located on the second end of the module so that two or more like modules can readily be interengaged by inserting the pins in the recesses of an adjacent module. A supplemental pair of diverging tangs 15 can also extend from one end of the module to ease interconnection of the modules. When so interconnected, as depicted by the two end portions of modules 9 and 9' in FIG. 5, the extended end 36a of rack 36 overlaps into the foreshortened area of rack 36' of module 9' so that the racks align to enable the spur gear 38 to travel from one to the next, taking the entire carriage subassembly onto the track portion of the next module. This enables the torch to be advanced the length necessary for the job.

To use the novel apparatus, one or more modules are readily carried by handle 60 to the location at which stock is to be cut, e.g. in a storage yard, positioned in proper orientation on the stock to be cut, preferably using an edge of support 12 to align the unit with a straight line to be cut. The magnets hold it in position. If a length greater than that of one module is to be cut, one or more additional modules are placed in aligned interconnection therewith as previously described. A torch T in torch mount subassembly 26 is placed with its discharge nozzle oriented downwardly toward the stock.

The unit is then ready for operation. After the torch is lit, the carriage and torch are manually advanced at a controlled rate necessary for the thickness of the stock by rotating crank 42c to drive carriage 24 with torch T along a line parallel to elongated track 14.

To further accommodate transfer of the spur gear 38 from one gear rack to an adjacent one, a resilient material, e.g. rubber, can be employed for the bearing mount 43 of the shaft 40 for gear 38, to impart limited flexibility thereto.

With the novel apparatus, there is no need to haul heavy stock into a shop or other processing area, even to make a long cut. There is no necessity for electrical power. The unit will operate quickly, efficiently, and accurately for many types of stock, serving as a handy, inexpensive tool as for smaller welding shops or farm usage.

Certain details of construction could be changed within the concept presented to accommodate particular usage. Therefore, it is not intended that the invention is to be limited to the illustrative embodiment depicted, but only by the scope of the appended claims and reasonable equivalents thereto.

The embodiments of the invention in which an exclusive property or privilege is claimed are defined as follows:

1. A portable torch support and guide apparatus comprising:
   an elongated module including a support base for resting on stock to be cut, and retention magnets on said support base for retaining said support base to said stock;
   an upstanding elongated carriage guide track;
   a torch mounting carriage movable along said track, and having a drive mechanism for advancing said carriage, said drive mechanism including a drive gear;
   a gear rack on said module, being engageable by said drive gear; said gear rack being positioned longitudinally offset on said module with one end of said gear rack extending beyond said guide track at one end of said module; the opposite end of said gear rack being foreshortened on the end of said wide track to define an end space on said guide track, whereby the outwardly extending end of said gear rack overlaps onto the end space of an adjacent module in aligned relation to said elongated module, whereby said drive gear can transfer from said elongated module gear rack to the adjacent module gear rack to advance said carriage from said elongated module to the adjacent module; and
   interconnect alignment means for end to end interconnection and alignment of adjacent modules, whereby two or more like modules can be interconnected in an aligned relationship.

2. The apparatus in claim 1 wherein said interconnect alignment means includes projections on one end of the module and cooperative recesses on the opposite end to interfit with the projections on the adjacent module.

3. The apparatus in claim 2 also including a pair of divergent tangs on the end of said module for ease of alignment with an adjacent module.

4. The apparatus in claim 1 or 3, wherein:
   said drive gear is rotatably supported in a resilient sleeve to facilitate the transfer of said torch carriage from one module to another module.

5. A portable torch support and guide apparatus comprising:
   an elongated module including a support base for resting on stock to be cut, and retention magents on said support base for retaining said support base to said stock;
   an upstanding elongated carriage guide track;
   a torch mounting carriage movable along said track, and having a drive mechanism for advancing said carriage, said drive mechanism including a drive gear;
   a gear rack on said module engageable by said drive gear, one end of said gear rack extending beyond said guide track at one end of said module to allow overlap thereof on an adjacent module in aligned relation to said elongated module, whereby said drive gear can transfer from said elongated module gear rack to the adjacent module gear rack to advance said carriage from said elongated module to the adjacent module; and wherein
   said drive gear is rotatably supported in a resilient sleeve to facilitate the transfer of said torch carriage from one module to another module.

* * * * *